United States Patent Office 3,775,430
Patented Nov. 27, 1973

3,775,430
OCTALONE CARBOXYLIC ACIDS AND THEIR DERIVATIVES
Abraham Weber, Paris, and Jacques Jean Frossard, Champigny, France, assignors to Mead Johnson & Company, Evansville, Ind.
No Drawing. Continuation of abandoned application Ser. No. 56,997, June 8, 1970, which is a division of application Ser. No. 389,489, Aug. 13, 1964, now Patent No. 3,532,742. This appplication Nov. 10, 1971, Ser. No. 197,486
Claims priority, application France, Sept. 26, 1963, 948,754
Int. Cl. C09d 27/52
U.S. Cl. 260—326 C          2 Claims

ABSTRACT OF THE DISCLOSURE

This invention relates to 6,6-dimethyl-$\Delta^9$-8-octalone carboxylic acids and derivatives thereof. The products are useful as pharmacological agents in view of their antibacterial, chloreretic activity, and ability to reduce blood cholesterol concentrations.

---

This application is a continuation of Ser. No. 56,997, filed June 8, 1970, now abandoned, which in turn is a division of Ser. No. 389,489, filed Aug. 13, 1964, and now U.S. Pat. No. 3,532,742.

The present invention concerns a novel class of chemical products having utility as chemical intermediates and having biological activity, especially choleretic propertes. These products comprise the 6,6-dimethyl-$\Delta^9$-8-octalone carboxylic acids corresponding to Formula I, the metal salts, and carboxyl derivatives thereof.

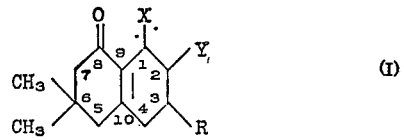

in which:

R is selected from the group consisting of pyridyl, phenyl, and phenyl bearing from one to two substituents selected from alkoxy having up to 4 carbon atoms, halogen, and hydroxyl;

X and Y are selected from the group consisting of hydrogen, phenyl, carboxyl, lower carbalkoxyl having up to 5 carbon atoms, carboxamide groups of the formula

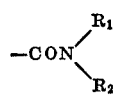

and together form a substituent selected from the group consisting of

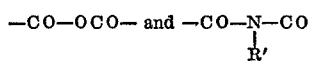

no more than one of X and Y being selected from hydrogen and phenyl, wherein

is selected from the group consisting of piperidino, morpholino, piperazino, and amino, wherein $R_1$ and $R_2$ are selected from the group consisting of hydrogen and lower alkyl having up to 4 carbon atoms, and R' is selected from the group consisting of hydrogen, lower alkyl having up to 4 carbon atoms, and di-lower alkylaminoalkyl having up to 4 carbon atoms in the alkyl portions thereof.

The products conforming to the invention, therefore, include mono-acids, di-acids, and their functional derivatives including amides, esters, and imides.

Synthetic methods useful for the preparation of these substances are illustrated in Equations 1, 2, 3, 4, and 5 which are shown below. Specific examples of biologically active products envisaged by this invention are given later, together with processes for preparing them.

In order to obtain the derivatives (I) according to the invention, it is necessary to obtain two groups of intermediate products, the dienones (II–a), and the octalone anhydrides (II–b) which are obtained from the dienones. The latter serve as intermediates for the di-acid, ester, amide, and imide types of Formula I.

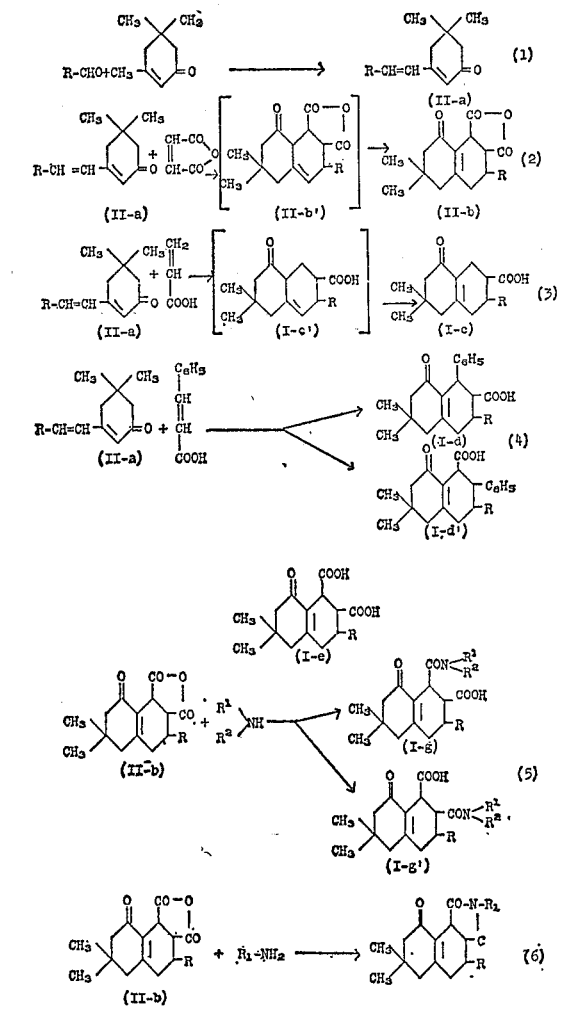

Intermediate dienones (II–a).—These products have the general formula shown in the table of formulas given above, in which R has the same significance as given above.

The intermediate dienones (II–a) are prepared by reacting aldehydes with 3,5,5-trimethylcyclohexenone (isophorone) in the presence of a warm dilute aqueous alkaline solution according to Equation 1.

It has been proven that in the case of benzaldehyde, the compound obtained indeed has the styryl cyclohexenone structure shown (Conia and O'Leary, C. R., 249, 1002 (1959); Bull. (1960), 212).

EXAMPLE 1

A mixture of 350 g. of isophorone, 260 g. of benzaldehyde, and 2.0 l. of 5% aqueous sodium hydroxide is refluxed with stirring for 5 hours. The mixture is allowed to cool and is neutralized with acetic acid; the crystalline product is collected and washed with water; there is thus obtained 48° g. of 3-styryl-5,5-dimethyl-2-cyclohexene-1-one, M.P. 78° C. (see Conia and O'Leary (loc. cit.) and Cornubert and Borel, Bull. (1929), 1158).

EXAMPLE 2

A mixture of 140.5 g. of p-chlorobenzaldehyde, 140 g. of isophorone, and 700 ml. of 5% aqueous sodium hydroxide is refluxed for 5 hours. The mixture is allowed to cool and is then neutralized with acetic acid; the product is dried and recrystallized from 300 cc. of boiling isopropanol. There is thus obtained 100 g. of 3-p-chlorostyryl-5,5-dimethylcyclohex-2-en-1-one, M.P. 114° C.

Other intermediate dienones are given in Table 1 below, in which the compound obtained in Example 2 is listed as No. 5:

TABLE 1.—DIENONES OF FORMULA II-a

| No. | R | M.P., °C. | Solvent of Crystallization | Comments |
| --- | --- | --- | --- | --- |
| 1 | (4) $CH_3OC_6H_4$ | 68 | Cyclohexane, Isopropyl ether | B.P. 228–233° C./1.5 mm. |
| 2 | (2) $CH_3OC_6H_4$ | 125–126 | Isopropanol | |
| 3 | (3) $CH_3OC_6H_4$ | 64 | Isopropyl ether | |
| 4 | (3,4) $(CH_3O)_2C_6H_3$ | 104 | Ethanol | |
| 5 | (4) $ClC_6H_4$ | 113–114 | Isopropanol | |
| 6 | (2) $HOC_6H_4$ | 168 | do | |
| 7 | (3) $HOC_6H_4$ | 205 | Ethanol, acetic acid | |
| 8 | (2,5) $(CH_3O)ClC_6H_3$ | 101 | Isopropanol | |
| 9 | 2-pyridyl | 84 | Dilute ethanol | Hydrochloride recrystallized from isopropanol, M.P. 184°. |

NB.—The number preceding the radical R indicates the carbon atom of the ring substituted with this radical.

Intermediate octalone anhydrides (II–b).—These intermediate products are represented by Formula II–b in Equation 2. They correspond to Formula I in which X and Y together form an anhydride group —CO—OCO.

The anhydrides (II–b) are obtained starting from the intermediate dienones (II–a) by warming with maleic anhydride, with or without a solvent. The reaction is shown by Equation 2.

Reaction of the dienones (II–a) with dienophiles such as maleic anhydride and acrylic acid leads to derivatives of $\Delta^9$-8-octalone, resulting from displacement of the double bond from its transitory position 4 [structure [II–b'] in brackets] to position 9 corresponding to structure (II–b) (double bond conjugated with the carbonyl). Proof of the position of the double bond has been obtained by infrared spectral studies, by ultraviolet studies, and by nuclear magnetic resonance.

EXAMPLE 3

A mixture of 5.12 g. of 3-(o-methoxystyryl)-5,5-dimethylcyclohex-2-en-1-one (No. 2 in Table 1) and 2 g. of maleic anhydride is heated for 2 hours on a boiling water bath. The product so obtained is dissolved in a minimum of hot benzene. On cooling, there crystallizes 5.9 g. of the anhydride 3-(o-methoxystyryl)-6,6-dimethyl-$\Delta^9$-8-octalone-1,2-dicarboxylic acid, M.P. 167–168° C.

There is thus obtained compound No. 13 of Table 2 which follows and in which are given other examples of these intermediate anhydrides.

The anhydrides are crystalline substances, soluble in most organic solvents and giving the usual reactions of anhydrides of 1,2-dicarboxylic acids. The properties of the new intermediate compounds prepared are summarized in Table 2.

TABLE 2.—OCTALONE-1,2-DICARBOXYLIC ANHYDRIDES OF FORMULA II-b

| No. | R | M.P., °C. | Solvent of crystallization |
| --- | --- | --- | --- |
| 10 | $C_6H_5$ | 135–136 | Ethanol, ethyl acetate. |
| 11 | (4) $ClC_6H_4$ | 187–188 | Benzene, ethanol. |
| 12 | (4) $CH_3OC_6H_4$ | 98–100 | Benzene. |
| 13 | (2) $CH_3OC_6H_4$ | 167–168 | Do. |
| 14 | (3) $CH_3OC_6H_4$ | 155–156 | Ethanol. |
| 15 | (3,4) $(CH_3O)_2C_6H_3$ | 195 | Do. |

The intermediate products (II–a) and (II–b) make it possible to prepare the various compounds of Formula I covered by the invention.

Mono-acids.—These correspond to Formula I in which X=H and Y=COOH. These products are obtained as shown in Equation 3 by addition of the dienones (II–a) to acrylic acid or a derivative thereof.

As before, the double bond in the 4-position in the transient addition product (I–c') is displaced to the 9-position. The reaction is carried out by refluxing the reactants. In many cases, two isomeric acids are obtained, starting from the same reactants, according to the conditions of the reaction. These are stereoisomers which differ in the respective positions of the R and COOH groups, in relation to the ring. Both the cis and trans forms of these products are covered by the present invention. The various compounds of this group more specifically covered by the invention are given in Table 3.

TABLE 3.—OCTALONE-2-CARBOXYLIC ACIDS OF FORMULA 1-c

| Number | R | Reaction conditions [1] | Solvent of crystallization | M.P., °C. | Comments |
| --- | --- | --- | --- | --- | --- |
| 16 | $C_6H_5$ | a, b | Ethanol, acetic acid | 212–214 | See Note A. |
| 17 | (4) $CH_3OC_6H_4$ | a | Ethyl acetate | 162 | Cis isomer. |
| 18 | (4) $CH_3OC_6H_4$ | b | Isopropanol | 204 | Trans isomer. |
| 19 | (2) $CH_3OC_6H_4$ | a | do | 164 | Cis isomer. |
| 20 | (2) $CH_3OC_6H_4$ | b | Isopropanol, ethanol | 208 | Trans isomer. |
| 21 | (3) $CH_3OC_6H_4$ | a | Isopropanol | 151 | |
| 22 | (4) $ClC_6H_4$ | a | Ethyl acetate | 149 | Cis isomer. |
| 23 | (4) $ClC_6H_4$ | b | Isopropanol | 212 | Trans isomer. |
| 24 | (2,5) $(CH_3O)ClC_6H_3$ | b | do | 211 | |
| 25 | (3) $HOC_6H_4$ | a | Methanol | 252 | |

[1] The conditions of the reaction have been indicated for identification of the derivative, different reaction conditions leading to different isomers—Conditions of the reaction: a=Heating 3–4 hours on an oil bath kept at 130–140° C.; b=The oil bath is heated gradually to 250° C. and is kept at this temperature for 4 hours.

NOTE A.—Ethyl ester, M.P. 97°C, and its oxime, M.P. 179° C. Methyl ester, M.P. 101° C. The esters are obtained by esterification of the acid with a mineral acid, or by addition of the diene to the corresponding acrylic esters.

The compounds thus obtained are well crystallized solids, showing the general reactions of carboxylic acids, and especially can be titrated by acidimetry. Their salts with the alkali metals are soluble in water. Other metal salts, and salts with other inorganic and organic bases are prepared by neutralization in conventional fashion.

EXAMPLE 4

3-styryl-5,5-dimethyl cyclohex-2-en-1-one, 10 g., acrylic acid, 5.0 g., and 0.1 g. of hydroquinone are refluxed for 3–4 hours (until a sample of the reaction mixture becomes soluble in dilute aqueous sodium hydroxide). The mixture is allowed to cool and the product is crystallized by addition of water. The material is filtered, washed with water, and recrystallized from acetic acid or ethanol. There is thus obtained 6.8 g. of 3-phenyl-6,6-dimethyl-$\Delta^9$-8-octalone-2-carboxylic acid, M.P. 212–214° C. (Compound No. 16 in Table 3).

EXAMPLE 5 o-Methoxybenzylidene isophorone (Compound No. 2, Table 1), 20 g., acrylic acid, 9 g., and 0.1 g. of hydroquinone are heated for 3 hours on an oil bath kept at 130–140° C. The mixture is allowed to cool and is then dissolved in 2 N aqueous sodium hydroxide solution. The alkaline solution is extracted with ether and the product precipitated as an oil with hydrochloric acid. The product so obtained solidifies on standing. It is collected, washed with water, and recrystallized from isopropanol. There is thus obtained 16.8 g. of cis 3-o-methoxyphenyl-6,6-dimethyl-$\Delta^9$-8-octalone-2-carboxylic acid, M.P. 164° C. (Compound No. 19, Table 3).

EXAMPLE 6 o-Methoxybenzylidene isophorone, 20 g., acrylic acid, 9 g., and 0.1 g. of hydroquinone are heated on an oil bath. The temperature of the oil is raised gradually to 250° C. and is kept at this temperature for 4 hours. The mixture is then treated as in Example 5 and there is obtained 12 g. of the transisomer of that in Example 5, M.P. 208° C. (Compound No. 20, Table 3).

A special case is that of 3-(2'-hydroxystyryl)-5,5-dimethylcyclohex-2-en-1-one (Compound No. 6, Table 1). Reaction of this dienone with acrylic acid at a temperature of 130–140° under reflux on an oil bath leads to the lactone of 3 - (o-hydroxyphenyl)-6,6-dimethyl-$\Delta^9$-8-octalone-2-carboxylic acid (No. 26), M.P. 190° C. (after recrystallization from ethanol) (oxime M.P. 243° C.).

With cinnamic acid, reaction with the dienones (II–a) gives carboxylic acids of Formula I–d or I–d', the reaction being indicated by Equation 4 in the table of formulas.

The following compounds have thus been prepared: No. 27, R=C$_6$H$_5$, M.P. 215° C. (after recrystallization from ethanol); No. 28, R=(3,4)(CH$_3$O)$_2$C$_6$H$_3$, M.P. 168° C. (d.°). C. (d.°).

EXAMPLE 7

Cinnamic acid, 15 g., 3-styryl-5,5-dimethyl-2-cyclohexene-1-one, 23 g., and 0.1 g. of hydroquinone are heated for 5 hours at 180° C. The mixture is allowed to cool and is dissolved by warming in its volume of benzene; on cooling there crystallizes 5 g. of cinnamic acid, which is removed by filtration. The filtrate is extracted with 2 N NaOH and the 1,3-diphenyl-6,6-dimethyl-$\Delta^9$-8-octalone-2-carboxylic acid or its isomer of Formula I–d' is precipitated by addition of hydrochloric acid.

Di-acids.—These correspond to Formula I in which $$X=Y=COOH$$

They are represented by Formula I–e. These compounds result from hydrolysis of the intermediate anhydrides (II–b) in alkaline medium.

Table 4 contains data on represenative examples of such derivatives:

TABLE 4.—OCTALONE-1,2-DICARBOXYLIC ACIDS (I–e)

| No. | R | Solvent of crystallization | M.p., ° C. |
|---|---|---|---|
| 29 | C$_6$H$_5$ | Ethanol | 245 |
| 30 | (4) CH$_3$OC$_6$H$_4$ | Benzene | 160 |
| 31 | (2) CH$_3$OC$_6$H$_4$ | Ethanol, 90% | 235–240 |
| 32 | (3) CH$_3$OC$_6$H$_4$ | Ethanol | 164 |
| 33 | (3,4) (CH$_3$O)$_2$C$_6$H$_3$ | do | 180 |

EXAMPLE 8

The anhydride of 3-(o-methoxyphenyl)-6,6-dimethyl-$\Delta^9$-8-octalone-1,2-dicarboxylic acid, 2.0 g., prepared as in Example 3 (No. 13), and 40 cc. of 2 N sodium hydroxide are heated until a homogeneous solution is obtained. The mixture is allowed to cool and is acidified with hydrochloric acid. The product which precipitates is collected on a filter and washed with water. It is recrystallized from 90% aqueous ethanol. There is thus obtained 20 g. of 3-(o-methoxyphenyl)-6,6-dimethyl - $\Delta^9$ - 8 - octalone-1,2-dicarboxylic acid, M.P. 235–240° C. (No. 31, Table 4).

Esters.—These compounds are prepared by reaction of the anhydrides (II–b) with alcohols (or with phenols). One can thus obtain either mono- or diesters.

In certain cases, the condensation with dienophiles, which leads to the anhydrides (II–b), and the esterification can be carried out in a single step.

EXAMPLE 9

Fifteen grams of the anhydride of 3-phenyl-6,6-dimethyl-$\Delta^9$-8-octalone-1,2-dicarboxylic acid (No. 10, Table 2) is dissolved in 100 cc. of anhydrous ethanol; gaseous hydrogen chloride is then passed into the solution to saturation in the cold. The mixture is allowed to stand overnight and is then refluxed for 4 hours. The excess of alcohol is removed under vacuum and the residue is taken up in ether and water; it is washed with a solution of 5% sodium carbonate solution and then with water. The ethereal solution is dried over anhydrous sodium sulfate and the solvent is removed by distillation. The crystalline residue is recrystallized from petroleum ether to obtain 10 g. of 3-phenyl-6,6-dimethyl-$\Delta^9$-8-octalone-1,2 - dicarboxylic acid diethyl ester, M.P. 82° C. (No. 34).

EXAMPLE 10

The anhydride of 3-phenyl-6,6-dimethyl-$\Delta^9$-8-octalone-1,2-dicarboxylic acid (No. 10, Table 2), 5 g., is dissolved in 25 cc. of anhydrous acetone; there is added to this solution 1.8 cc. of $\beta$-dimethylaminoethanol. The reaction mixture becomes hot and is then refluxed for 1 hour; the solvent is evaporated and the residue is triturated with anhydrous ether. The product is recrystallized from isopropanol by the addition of ether. There is thus obtained 4.1 g. of the 2-($\beta$-dimethylaminoethyl)ester of 3-phenyl-6,6-dimethyl-$\Delta^9$-8-octalone-1,2-dicarboxylic acid or its isomer, the 1-($\beta$-dimethylaminoethyl)-ester (No. 35), M.P. 168–170° C.

In the case of 3-(o-hydroxystyryl)-5,5-dimethylcyclohex-2-en-1-one addition of maleic anhydride and esterification of the phenolic hydroxyl group occur simultaneously.

EXAMPLE 11

(Condensation and esterification in a single step)

3-(o-hydroxystyryl)-5,5-dimethylcyclohex - 2 - en-1-one (No. 6, Table 1), 8.6 g., maleic anhydride, 3.2 g., and 40 cc. of toluene are refluxed together. The reaction mixture is allowed to cool and is then filtered, and there is thus obtained 7.8 g. of the lactone of 3-(o-hydroxyphenyl)-6,6-dimethyl-$\Delta^9$-8-octalone-1,2-dicarboxylic acid, M.P. 236° C. (No. 36).

Amides.—The reaction of the anhydrides (II–b) with primary or secondary amines leads to amide acids (I–g or I–g' of Equation 5). R$_1$ and R$_2$ have the definition given above.

Compounds (I–g) or (I–g') so obtained have the characteristics of carboxylic acids and of amides and, in particular, can be titrated by acidimetry. As the compounds obtained are frequently mixtures of isomers, they show a rather large range of melting point. The preparation can be carried out in aqueous medium or in an organic solvent, using one or more molar proportions of the amine.

Table 5 gives the conditions for preparation, the formulas, and the important physical properties of certain representative products. In this table, the letters (a), (b), and (c) have the following meanings:

(a) Preparation carried out in aqueous medium with an excess of amine (mor ethan 2 molar equivalents).

(b) (Solvent) Preparation carried out in organic medium with excess of amine (more than 2 molar equivalents).

(c) (Solvent) Preparation carried out in organic medium using one mole of anhydride to one mole of amine.

EXAMPLE 12

The anhydride of 3-phenyl-6,6-dimethyl-$\Delta^9$-8-octalone-1,2-dicarboxylic acid, 10 g., is dissolved in 50 cc. of anhydrous acetone. The mixture is chilled in an ice bath, and a current of ammonia gas is passed in until an alkaline pH is evident. The product is filtered and the pasty material is washed with acetone. It is dried in air and then dissolved in water. The mixture is filtered and acidified with hydrochloric acid solution; the precipitate is collected, washed with water, and dried in vacuo. There is thus obtained 7 g. of 3-phenyl-6,6-dimethyl-$\Delta^9$-8-octalone-2-carboxamide - 1 - carboxylic acid (or 1-carboxamide-2-carboxylic acid), M.P. 190–192° C. (No. 37).

EXAMPLE 13

The anhydride of 3-phenyl-6,6-dimethyl-$\Delta^9$-8-octalone-1,2-dicarboxylic acid, 10 g., is dissolved in 50 cc. of acetone and there is added to this solution with cooling in an ice bath and stirring, 20 g. of a 33% aqueous solution of monomethylamine. The mixture is stirred for 1 hour. The solution becomes homogenous and then partially crystallizes; the solid is redissolved with 100 cc. of water.

The solution is acidified with hydrochloric acid; the crystalline precipitate is collected and washed with water. It is recrystallized from ethanol to give 7.8 g. of 3-phenyl-6,6-dimethyl-$\Delta^9$-8-octalone - 2 - N - methylcarboxamide-1-carboxylic acid or the 1-N-methylcarboxamide-2-carborylic acid, M.P. 176° C. (No. 43).

EXAMPLE 14

The anhydride of 3-phenyl-6,6-dimethyl-$\Delta^9$-8-octalone-1,2-dicarboxylic acid, 3.24 g., is dissolved in 7 cc. of ethyl TABLE 5.—OCTALONE 1,2-DICARBOXYLIC ACID MONOAMIDES OF FORMULA I-g and I-g'

| N | R | $\begin{array}{c}R_1\\N\\\phantom{N}R_2\end{array}$ | Technique | M.P., °C. | Solvent recrystallization |
|---|---|---|---|---|---|
| 37 | $C_6H_5$ | $NH_2$ | b (acetone) | 190–192 | Acetone. |
| 38 | $C_6H_5$ | $NH-CH_3$ | a / b (acetone) | 173–175 | Ethanol. |
| 39 | $C_6H_5$ | $NH-CH(CH_3)_2$ | b (acetone) | 200–205 | Ethyl acetate, isopropanol. |
| 40 | $C_6H_5$ | $NH-C_4H_9$ (4) | do | 180–182 | Ethanol. |
| 41 | $C_6H_5$ | $NH-C(CH_3)_3$ | b (acetone) / b ($CH_2Cl_2$) / c ($CH_2Cl_2$) | 195–200 | Chloroform isopropanol. |
| 42 | $C_6H_5$ | $NH-\text{pyridyl}$ | c (ethyl acetate) | 180 | Ethyl acetate. |
| 43 | $C_6H_5$ | $N(CH_3)_2$ | a / b (acetone) | 176–180 | Isopropanol. |
| 44 | $C_6H_5$ | $N(C_2H_5)_2$ | a / b (acetone) / b ($CH_2Cl_2$) / c ($CH_2Cl_2$) | 195–200 | Isopropanol ethyl acetate. |
| 45 | $C_6H_5$ | thiazolyl | c (ethyl acetate) | 180–182 | Ethyl acetate. |
| 46 | $C_6H_5$ | thiazolyl | b (acetone) | 148–150 | Isopropanol. |
| 47 | $C_6H_5$ | N-methylpiperazinyl | c (ethyl acetate) | 236 | Ethanol.[1] |
| 48 | (2) $CH_3OC_6H_4$ | $N(C_2H_5)_2$ | b (acetone) | 210 | Isopropanol. |
| 48A | (3) $CH_3OC_6H_4$ | $N(C_2H_5)_2$ | b ($CH_2Cl_2$) | 180–185 | Do. |
| 49 | (4) $CH_3OC_6H_4$ | $N(C_2H_5)_2$ | b (acetone) | 174 | Ethanol. |

[1] Soluble in both acid and alkaline medium.

acetate. There is added 0.85 cc. of piperidine and the exothermic reaction is allowed to proceed; the mixture is allowed to stand until crystallization occurs and the product is collected by filtration. There is obtained 2.6 g. of 3-phenyl-6,6-dimethyl-$\Delta^9$-8-octalone - 2 - (1 - piperidinocarbonyl)-1-carboxylic acid or the 2-carboxylic acid-(1-piperidinocarbonyl) compound, M.P. 170° C., (No. 45). Crystallization of this compound from ethyl acetate raises the melting point to 180–182° C.

Imides.—The action of primary amines, $R_1$—$NH_2$, on the anhydrides (II-b) gives rise, after dehydration, to the imides (I-h) shown in Equation 6.

The following representative examples of these compounds are given:

EXAMPLE 15

The anhydride of 3-phenyl-6,6-dimethyl-$\Delta^9$-8-octalone-1,2-dicarboxylic acid, 50 g., is suspended in 80 cc. of xylene and there is added slowly and with cooling 12 g. of n-butylamine. The reaction mixture is refluxed for 6 hrs. using a Dean-Stark trap to remove the water. The solvent is removed under vacuum. The residue is dissolved in ether and washed with 0.5 N aqueous sodium hydroxide solution and then with water. It is dried and the solvent evaporated; there is thus obtained 35 g. of oily residue which is washed with petroleum ether and recrystallized from isopropanol to give 25 g. of 3-phenyl-6,6-dimethyl-$\Delta^9$-8 - octalone - 1,2-N-(n-butyl)dicarboximide, M.P. 112° C. (No. 50). The oxime of this compound melts at 177° after recrystallization from ethanol.

EXAMPLE 16

The anhydride of 3-phenyl-6,6-dimethyl-Δ⁹-8-octalone-1,2-dicarboxylic acid, 15 g., is treated with cooling with 4.5 g. of N,N-dimethylethylenediamine. The mixture is heated for 2 housr at 180° C. It is allowed to cool and is then dissolved in ether. The ethereal solution is washed with water and is extracted with dilute hydrochloric acid. The acid solution is made basic with sodium hydroxide and the precipitated oil is taken up in ether; this solution is dried over calcium chloride, and the hydrochloride is precipitated by passing in anhydrous hydrogen chloride gas. The product so obtained is recrystallized from 90% isopropanol to give 6.5 g. of the hydrochloride of 6,6-dimethyl-3-phenyl-Δ⁹-8-octalone - 1,2 - [N-(β-dimethylaminoethyl)]dicarboximide, which melts with decomposition about 280° C. (No. 51).

The compounds of the present invention are useful as chemical intermediates in the synthesis of biologically active end products and as pharmaceutical products in their own right, in view of their antibacterial, choleretic activity, and ability to reduce blood cholesterol concentrations.

As an example of one compound of the present invention having utility as a chemical intermediate, 6,6-dimethyl-3-phenyl-Δ⁹-8-octalone-1,2-dicarboxylic acid anhydride may be mentioned. This anhydride reacts with water, alcohol, amines, and other organic compounds to provide a variety of the corresponding carboxylic acid derivatives including esters, amides, etc.

As compounds of the present invention illustrating a useful degree of antibacterial activity, the following may be mentioned:

No. 20.—6,6-dimethyl-3-(2-methoxyphenyl)-Δ⁹-8-octalone-2-carboxylic acid
No. 23.—6,6-dimethyl-3-(4-chlorophenyl)-Δ⁹-8-octalone-2-carboxylic acid
No. 24.—6,6-dimethyl-3-(2-methoxy-5-chlorophenyl)-Δ⁹-8-octalone-2-carboxylic acid.

These substances are variously effective in inhibiting the growth of the following organisms: *Staphylococcus aureus*, Staphylococcus No. 133, *Staphylococcus pyogenes*, *Neisseria gonorrheae*, *Diplococcus pneumoniae*, *Streptococcus hemolyticus*, etc. The latter two substances named are superior to sulfathiazole in effectiveness against certain of these organisms. They may be administered locally in the form of solutions containing 0.2 to 10% by weight of the active ingredient.

The following substances are preferred species of the present invention as choleretic agents:

No. 16.—6,6-dimethyl-3-phenyl-Δ⁹-8-octalone-2-carboxylic acid
No. 51.—6,6-dimethyl-3-phenyl-Δ⁹-8-octalone-1,2-[N-(β-dimethylaminoethyl)]dicarboximide
No. 17.—6,6-dimethyl-3-(4-methoxyphenyl)-Δ⁹-8-octalone-2-carboxylic acid
No. 21.—6,6-dimethyl-3-(3-methoxyphenyl)-Δ⁹-8-octalone-2-carboxylic acid
No. 38.—6,6-dimethyl-3-phenyl-Δ⁹-8-octalone-1,2-dicarboxylic acid mono-N-methylamide
No. 41.—6,6-dimethyl-3-phenyl-Δ⁹-8-octalone-1,2-dicarboxylic acid N-tertiary butyl monoamide
No. 44.—6,6-dimethyl-3-phenyl-Δ⁹-8-octalone-1,2-dicarboxylic acid N,N-diethyl monoamide
No. 48.—6,6-dimethyl-3-(2-methoxyphenyl)-8-octalone-1,2-dicarboxylic acid N,N-diethyl monoamide
No. 48A.—6,6-dimethyl-3-(3-methoxyphenyl)-Δ⁹-8-octalone-1,2-dicarboxylic acid N,N-diethylamide
No. 37.—6,6-dimethyl-3-phenyl-Δ⁹-8-octalone-1,2-dicarboxylic acid monoamide.

The first two compounds listed, Nos. 16 and 51, are particularly preferred for their choleretic activity. Compound No. 51 is more active than sodium dehydrocholate and, in addition, is free of spasmolytic and antihistiminic side effects.

The compounds of the present invention may be administered parenterally and orally for therapeutic purposes in dosages of 50–500 mg. in various of the usual pharmaceutical dosage forms including tablets, solutions, capsules, suspensions, granules, etc.

EXAMPLE A

Compressed tablets

The following ingredients are employed:

| | G. |
|---|---|
| 6,6-dimethyl-3-phenyl-Δ⁹-8-octalone - 1,2 - dicarboxylic acid N,N-dimethyl monoamide | 100 |
| Lactose | 80 |
| Corn starch | 56.25 |
| Talc | 12.50 |
| Magnesium stearate | 1.25 |

The octalone is mixed with the lactose and formed into a granulation with an aqueous solution of gelatin. The dry granulation is then blended with the talc and magnesium stearate and pressed into tablets, each weighing 250 mg. and containing 100 mg. of the active ingredient.

EXAMPLE B

Solution for injection

The following ingredients are employed:

| | |
|---|---|
| 6,6-dimethyl - 3 - phenyl-Δ⁹-8-octalone-1,2-dicarboxylic acid mono N-t-butylamide sodium salt, g. | 100 |
| Sodium chloride, g. | 25 |
| Distilled water, l. | 5 |

A solution of the ingredients is prepared, filtered to free it of foreign material, filled into ampoules, each containing 5 cc. of this solution corresponding to 100 mg. of the active ingredient, the ampoules sealed and sterilized in an autoclave.

EXAMPLE C

Topcal solution

The following ingredients are employed:

| | |
|---|---|
| 6,6-dimethyl - 3 - (4-chlorophenyl)-Δ⁹-8-octalone-2-carboxylic acid sodium salt, g. | 5 |
| Ethanol, ml. | 70 |
| Distilled water, ml. | 100 |

This solution is then suitable for topical application in the treatment of various bacterial infections.

What is claimed is:
1. A compound having the formula

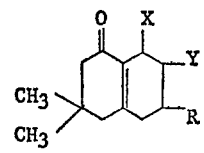

wherein R is phenyl or phenyl bearing from one to two substituents selected from alkoxy having up to four carbon atoms, halogen and hydroxyl and X and Y constitute the

group in which R' is hydrogen, lower alkyl having up to four carbon atoms, or diloweralkylaminoalkyl having up to four carbon atoms in each alkyl portion thereof.

2. 6,6-dimethyl - 3 - phenyl-$\Delta^9$-8-octalone-1,2-[N-($\beta$-dimethylaminoethyl)]dicarboximide.

References Cited
UNITED STATES PATENTS
3,440,248   4/1969   Roberts et al. ------ 260—326 C JOSEPH A. NARCAVAGE, Primary Examiner U.S. Cl. X.R.

260—247.2 A, 247.5 B, 268 BC, 293.6 Z, 346.3, 515 R; 424—308, 317